US010666656B2

(12) United States Patent
Jakobsson et al.

(10) Patent No.: US 10,666,656 B2
(45) Date of Patent: *May 26, 2020

(54) SYSTEMS AND METHODS FOR PROTECTING USERS FROM MALICIOUS CONTENT

(71) Applicant: PAYPAL, INC., San Jose, CA (US)

(72) Inventors: Bjorn Markus Jakobsson, San Jose, CA (US); James Roy Palmer, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/168,613

(22) Filed: Oct. 23, 2018

(65) Prior Publication Data
US 2019/0173882 A1 Jun. 6, 2019

Related U.S. Application Data

(63) Continuation of application No. 13/963,241, filed on Aug. 9, 2013, now Pat. No. 10,110,601.

(60) Provisional application No. 61/684,108, filed on Aug. 16, 2012.

(51) Int. Cl.
*H04L 29/06* (2006.01)

(52) U.S. Cl.
CPC ............. *H04L 63/10* (2013.01); *H04L 63/08* (2013.01); *H04L 63/1483* (2013.01); *H04L 63/168* (2013.01)

(58) Field of Classification Search
CPC ... H04L 63/10; H04L 63/168; H04L 63/1483; H04L 63/08; H04L 29/06
USPC .......................... 726/30, 2, 23, 27; 713/2, 6
See application file for complete search history.

(56) References Cited

U.S. PATENT DOCUMENTS

| 2010/0186088 A1* | 7/2010 | Banerjee | G06F 21/51 726/23 |
| 2013/0067115 A1* | 3/2013 | Lapanc | H04L 67/025 709/245 |

* cited by examiner

*Primary Examiner* — Ashokkumar B Patel
*Assistant Examiner* — Quazi Farooqui
(74) *Attorney, Agent, or Firm* — Haynes and Boone, LLP

(57) ABSTRACT

Systems and methods for authenticating a user attempting to access content are provided. The method includes requesting a first at least one user credential, determining if the requested first at least one user credential matches a second at least one user credential used when the user accessed previously accessed content, and generating a list of content providers requiring the second at least one user credential for access when the first at least one user credentials matches a second at least one user credential. The method also includes requiring the user to select a content provider from the list of content providers, allowing the user to access the content if the selected content provider corresponds to the content being accessed by the user, and preventing the user from accessing the content if the selected content provider does not correspond to the content being accessed by the user.

20 Claims, 13 Drawing Sheets

SYSTEMS AND METHODS FOR PROTECTING USERS FROM MALICIOUS CONTENT

CROSS REFERENCE TO RELATED APPLICATIONS

This application is a continuation of U.S. patent application Ser. No. 13/963,241 filed Aug. 9, 2013, now U.S. Pat. No. 10,110,601 issued on Oct. 23, 2018, entitled "SYSTEMS AND METHODS FOR PROTECTING USERS FROM MALICIOUS CONTENT,", which in turn claims priority to U.S. Provisional Patent Application No. 61/684,108, filed on Aug. 16, 2012, entitled "SYSTEM AND METHODS FOR PROTECTING USERS FROM MALICIOUS CONTENT,", the disclosures of which are hereby incorporated by reference herein in its entirety.

BACKGROUND

Technical Field

Embodiments disclosed herein are related to systems and methods for increasing internet security. In particular, systems and methods disclosed herein may protect users from malicious content by requiring a user to confirm the website that they are attempting to access and will not allow authentication to the website unless the website selected by the user matches the true identity of the website as determined by analyzing the website.

Related Art

As people use the internet for more and more reasons, scammers and so-called "black-hat" hackers increasingly look to the internet as a new frontier of illicit opportunity. People who use the internet to conduct financial transactions, such as making purchases and banking, can be attacked by the scammers and hackers and can be tricked into unwittingly divulging important personal information, such as login information, passwords, bank account information, and credit card numbers. The attackers can use this information for their financial gain, which can hurt the financial standing and credit rating of the people whose information is stolen.

One example of a known method used by attackers to obtain the personal information of internet users is called a "man-in-the-middle" attack. The "man-in-the-middle" attack is a type of abuse in which a proxy is used to intercept, modify and forward the internet traffic between one or more parties attempting to communicate or transact with one another. The attacking "man-in-the-middle" effectively "gets between" the one or more parties so that while it appears that the parties are establishing connections between one another, they are actually establishing a connection with the attacker. The attacker can thus intercept or even change data, such as personal data and financial data by impersonating the one or more parties to each other, compromising the security of internet communications and transactions. In many cases, these so-called "man-in-the-middle" attacks typically result from vulnerable security protocols.

Another common attack is what is known as a "man-in-the-browser" attack. In this attack, the proxy resides in a browser of one of the one or more parties as a client. "Man-in-the-browser" attacks can be problematic as they defy traditional efforts to detect the presence of a proxy using heuristics such as an IP address, machine identification number, or media access control (MAC) address of a machine because the proxy cannot be distinguished from the client by a server. Often, these so-called "man-in-the-browser" attacks result from vulnerability in the code of the browser or operating systems, or other software vulnerabilities permitting infection of the client.

The variety and portability of internet-capable device have resulted in not only users being capable of performing internet communications and transactions more frequently, but also in the opportunity for attackers to trick users into giving them personal information and financial data. The lucrative potential that these attacks present the attackers encourages attackers to try and stay one or more steps ahead of the security. When a countermeasure or other security provision is put into place to stop or otherwise limit the effect of an attack, the attackers develop ways to overcome the countermeasure, or find additional ways to exploit the operating system, browser or other executable software to launch another, possibly more effective attack.

Accordingly, there is a need for a system and method that provides a system, method, and device that thwarts attacks by requiring a user to confirm the content the user is attempting to access and will not allow the user to authenticate with the content unless the user confirms the content.

Figure 1:
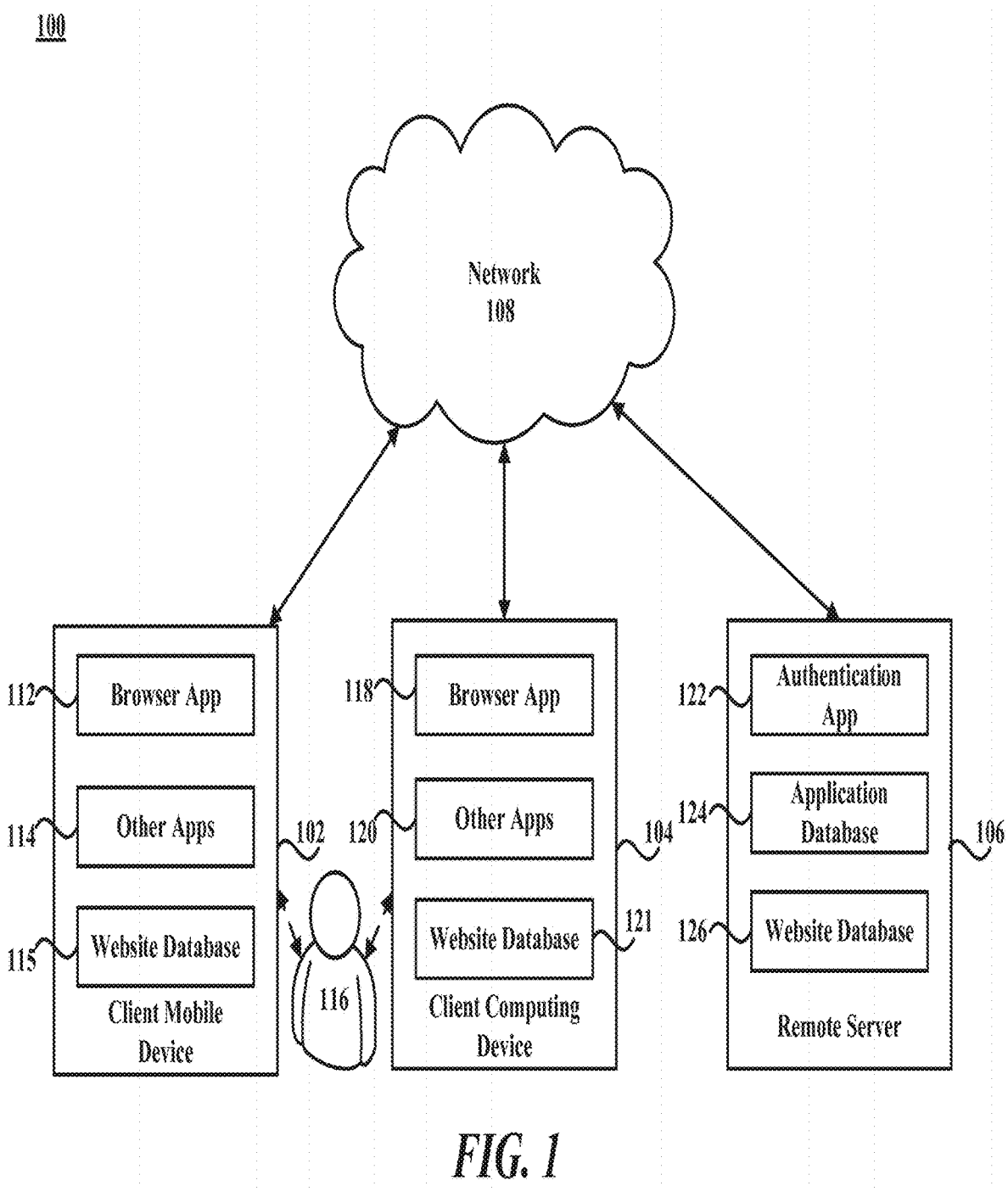
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

A type of attack that is not well known and has the potential to be just as effective, if not more effective than the attacks mentioned previously, is a "man-in-the-screen" attack. A "man-in-the-screen" attack is easy to implement and difficult to detect—both for end users and for software attempting to detect and block the attack. The "man-in-the-screen" attack can be executed in a number of ways, including by spoofing a web page or by spoofing an executing application. In the web spoofing scenario, the attacker produces a webpage that resembles a known webpage. In some cases, the attacker may go so far as to produce a webpage that resembles a home screen of a mobile device such as an iPhone™ or other smartphone based on the Android, webOS, Windows Mobile, or BlackBerry OS operating systems. For example, an attacker may make the webpage look like it includes familiar icons that a user would find on the home screen of the mobile device. The malicious webpage may also include code that hides the address bar when displayed, thus, improving the subterfuge. The displayed "icons" may then include a hyperlink that directs the user to a webpage that mimics the attributes of the program that the "icon" would normally represent. However, any personal information entered into the program would be captured by the webpage and forwarded to the attacker. Alternatively, the displayed "icons" may be non-functional when pressed such that the user believes that the smartphone has malfunctioned. The malicious webpage could then include code which causes a login prompt requiring a user to login into a personal account related to the smartphone (e.g., iTunes™ account for iOS™ based smartphones, or Google™ or Android Market™ accounts for Android based phones, or Windows™ Marketplace™ for Windows Mobile-based phones). The malicious webpage could also include code which causes a login prompt requiring a user to login into a financial account, such as a bank account or a payment provider such as PayPal. Moreover, the attacker could analyze information about the smartphone to determine what applications are installed, such as financial applications, password manager applications, or other applications which use and store important and fungible user information. Then, the attacker can display apparent popups to the user asking the user to input passwords for these applications, and collect the passwords that the user enters. Similar types of attacks can be envisioned, but are not easy to detect using traditional means, since it is hard for software to determine how a webpage would be rendered and understood by an end user and, thus, to determine whether this is abusive or intends to defraud.

Consistent with some embodiments, there is provided a method for authenticating a user attempting to access content. The method includes analyzing the content, generating a list of content providers based on the analyzed content, requiring the user to select a content provider from the list of content providers, allowing the user to access the content if the selected content provider corresponds to the content being accessed by the user, and preventing the user from accessing the content if the selected content provider does not correspond to the content being accessed by the user.

Further consistent with some embodiments, there is also provided a method for authenticating a user attempting to access content. The method includes requesting the user to enter a first at least one user credential, determining if the requested first at least one user credential matches a second at least one user credential used when the user accessed previously accessed content different from the content currently being accessed, and generating a list of content providers requiring the second at least one user credential for access when the first at least one user credentials matches a second at least one user credential. The method also includes requiring the user to select a content provider from the list of content providers, allowing the user to access the content if the selected content provider corresponds to the content being accessed by the user, and preventing the user from accessing the content if the selected content provider does not correspond to the content being accessed by the user.

These and other embodiments will be described in further detail below with respect to the following figures.

FIG. 1 is a block diagram of a networked system 100, consistent with some embodiments. System 100 includes a client mobile device 102, a client computing device 104, and a remote server 106 in communication over a network 108. Remote server may be a payment service provider server that may be maintained by a payment provider, such as PayPal, Inc. of San Jose, Calif. Server 106 may be maintained by other service providers in different embodiments. Remote server 106 may also be maintained by an entity with which sensitive credentials and information may be exchanged with client mobile device 102 and client computing device 104. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client mobile device 102, in one embodiment, may be implemented using any appropriate combination of hardware and/or software configured for wired and/or wireless communication over network 108. For example, client mobile device 102 may be implemented as a wireless telephone (e.g., smart phone), tablet, personal digital assistant (PDA), notebook computer, and/or various other generally known types of wired and/or wireless mobile computing devices. Consistent with some embodiments, client mobile device 102 may include any appropriate combination of hardware and/or software having one or more processors and capable of reading instructions stored on a non-transitory machine-readable medium for execution by the one or more processors. Consistent with some embodiments, client mobile device 102 includes a machine-readable medium, such as a memory (not shown) that includes instructions for execution by one or more processors (not shown) for causing client mobile device 102 to perform specific tasks. For example, such instructions may include displaying content, such as a web page or a user interface using a browser 112. Further, content may be content displayed by particular applications or "apps" 114 stored in a memory of client mobile device 102 and executed by one or more processors executing in client mobile device 102. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

As discussed above, client mobile device 102 may be a mobile device such as a smartphone such as an iPhone™ or other mobile device running the iOS™ operating system, the Android™ operating system, a BlackBerry™ operating system, Windows® Phone operating system, or webOS™. Client mobile device 102 may also be a tablet computer, such as an iPad™ or other tablet computer running one of the aforementioned operating systems. It should be appreciated that, in various embodiments, client mobile device 102 may be referred to as a user device or a customer/client device without departing from the scope of the present disclosure.

Consistent with some embodiments, browser 112 may be a mobile browser app, which may be used to provide a user interface to permit a user 116 to browse information available over network 108. For example, browser application 112 may be implemented as a web browser to view information available over network 108. Browser application 112 may include a software program, such as a graphical user interface (GUI), executable by one or more processors that is configured to interface and communicate with remote server 106 or other servers managed by content providers or merchants via network 108. For example, user 116 is able to access web sites to find and purchase items, as well as access user account information or web content. User 116, through client mobile device 102, may also communicate with remote server 106 to create an account, authenticate and/or log in to the account, and make a payment to a merchant or another individual connected to network 108.

Client mobile device 102, in one embodiment, may include other applications 114 as may be desired in one or more embodiments to provide additional features available to user 116, including accessing a user account with remote server 106. For example, applications 114 may include interfaces and communication protocols that allow the user to receive and transmit information through network 108 and to remote server 106 and other online sites. Applications 114 may also include security applications for implementing client-side security features, programmatic client applications for interfacing with appropriate application programming interfaces (APIs) over network 108 or various other types of generally known programs and/or applications. Applications 114 may include mobile apps downloaded and resident on client mobile device 102 that enables user 116 to access content through the apps. Client mobile device 102 may also include a website database 115 that may store information about websites and other content that user 116 interacts with using client mobile device 102. The stored information may include information relating to websites visited by user 116 including credentials used to log in to websites and information related to the content of websites. The stored information may be encrypted and not accessible by the user and may be only used for secure authentication purposes.

Client computing device 104, which can be similar to client mobile device 102, may be a separate device, such as a PC or laptop or netbook, or may be omitted if the user will be using only client mobile device 102. Both user devices may be used to access content with remote server 106 or other content provider. Client computing device 104, in one embodiment, may include a browser application 118 and other applications 120, similar to browser application 112 and applications 114 in client mobile device 102. Browser application 118 and applications 120 enable user 116 to access a payment provider web site and communicate with remote server 106, as well as other online sites. Client computing device 104 may also include a website database 121 that may store information about websites and other content that user 116 interacts with using client computing device 104. The stored information may include information relating to websites visited by user 116 including credentials used to log in to websites and information related to the content of websites. The stored information may be encrypted and not accessible by the user and may be only used for secure authentication purposes.

Remote server 106 according to some embodiments, may be maintained by an online payment provider, which may provide processing for online financial and information transactions on behalf of user 116. Remote server 106 may include at least one authentication application 122, which may be adapted to interact with client mobile device 102 and/or client computing device 104 over network 108 to authenticate requests to access accounts and purchase items, products and/or services by user 116. Authentication application 122 may be configured to interact with a user 116 to authenticate the user through user credentials such as a password or personal identification number (PIN) and automatically store the PIN and/or password. Remote server 106 may also include an application database 124 for storing various applications for interacting with client mobile device 102 and client computing device 104 over network 108 for purposes other than authentication. Such applications may include applications for conducting financial transactions and shopping and purchasing items. Remote server 106 may also include a website database 126 that may store information about websites and other content that users including user 116 interacts with using client mobile device 102 or client computing device 104. The stored information may include information relating to websites visited by user 116 including credentials used to log in to websites and information related to the content of websites. The stored information may be encrypted and may be only used for secure authentication purposes.

Figure 2:
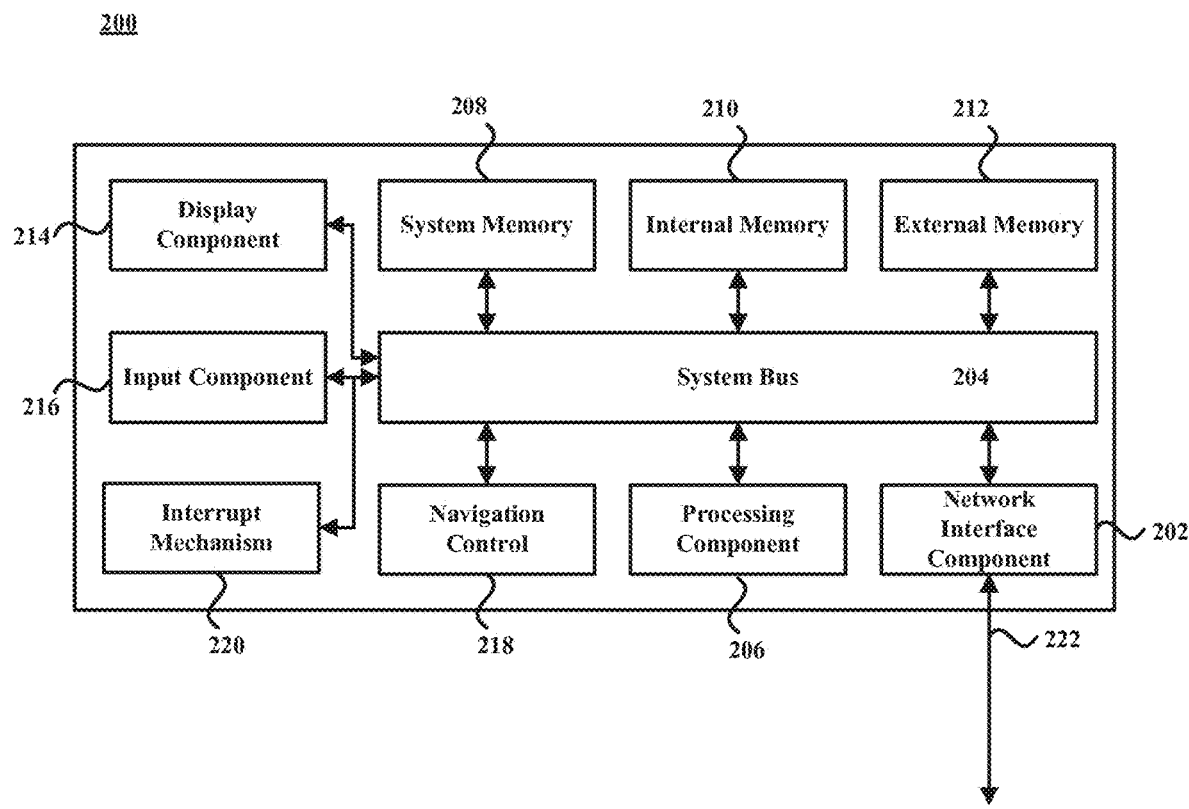
FIG. 2 is a diagram illustrating a computing system, consistent with some embodiments.

FIG. 2 is a diagram illustrating computing system 200, which may correspond to any of client mobile device 102, client computing device 104, or remote server 106, consistent with some embodiments. Computing system 200 may be a mobile device such as a smartphone such as an iPhone™ or other mobile device running the iOS™ operating system, the Android™ operating system, a BlackBerry™ operating system, or webOS™, as would be consistent with client mobile device 102. Computing system 200 may also be a tablet computer such as the iPad™ or other similar device running the aforementioned operating systems. Computing system 200 may also be personal computer, laptop computer, netbook, or tablet computer as would be consistent with client computing device 104. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, graphics processors, or digital signal processors (DSP), a system memory component 208, which may correspond to random access memory (RAM), an internal memory component 210, which may correspond to read-only memory (ROM), and a external or static memory 212, which may correspond to optical, magnetic, or solid-state memories. Consistent with some embodiments, computing system 200 further includes a display component 214 for displaying information to a user 116 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 116 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if system 200 includes a touch screen, display component 214, input component 216, and navigation control 218 may be a single integrated component, such as a capacitive sensor-based touch screen.

Further consistent with some embodiments, computing system 200 may include interrupt mechanism 220. Interrupt mechanism 220 may be any mechanism that causes a hardware or software interrupt of computing system 200. Other examples of interrupt mechanism 220 include a capacitive sensor, a combination of key presses (such as CTRL+ALT+DELETE), a power button, or a reset button. Interrupt mechanism 220 may also correspond to a sensor output, such as the aforementioned capacitive sensor indicating a touch made at a predetermined location on a touch screen of device 220, or the output of an accelerometer in device 220 indicating a particular motion, such as a "shake" motion. Interrupt mechanism 220 may comprise many different arrangements of buttons or button sequence so long as the generated interrupt causes a particular action to occur and the interrupt is only generated by the user. Consistent with some embodiments, the generated interrupt may cause an acceptance action in some cases or a termination action in other cases. Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure.

Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another.

Computing system 200 may transmit and receive messages, data and one or more data packets, information and instructions, including one or more programs (i.e., application code) through communication link 222 and network interface component 202. Communication link 222 may be wireless through a wireless data protocol such as Wi-Fi™, 3G, 4G, HDSPA, LTE, RF, NFC, or through a wired connection. Network interface component 202 may include an antenna, either separate or integrated, to enable transmission and reception via communication link 222. Received program code may be executed by processing component 206 as received and/or stored in memory 208, 210, or 212.

Figure 3A:
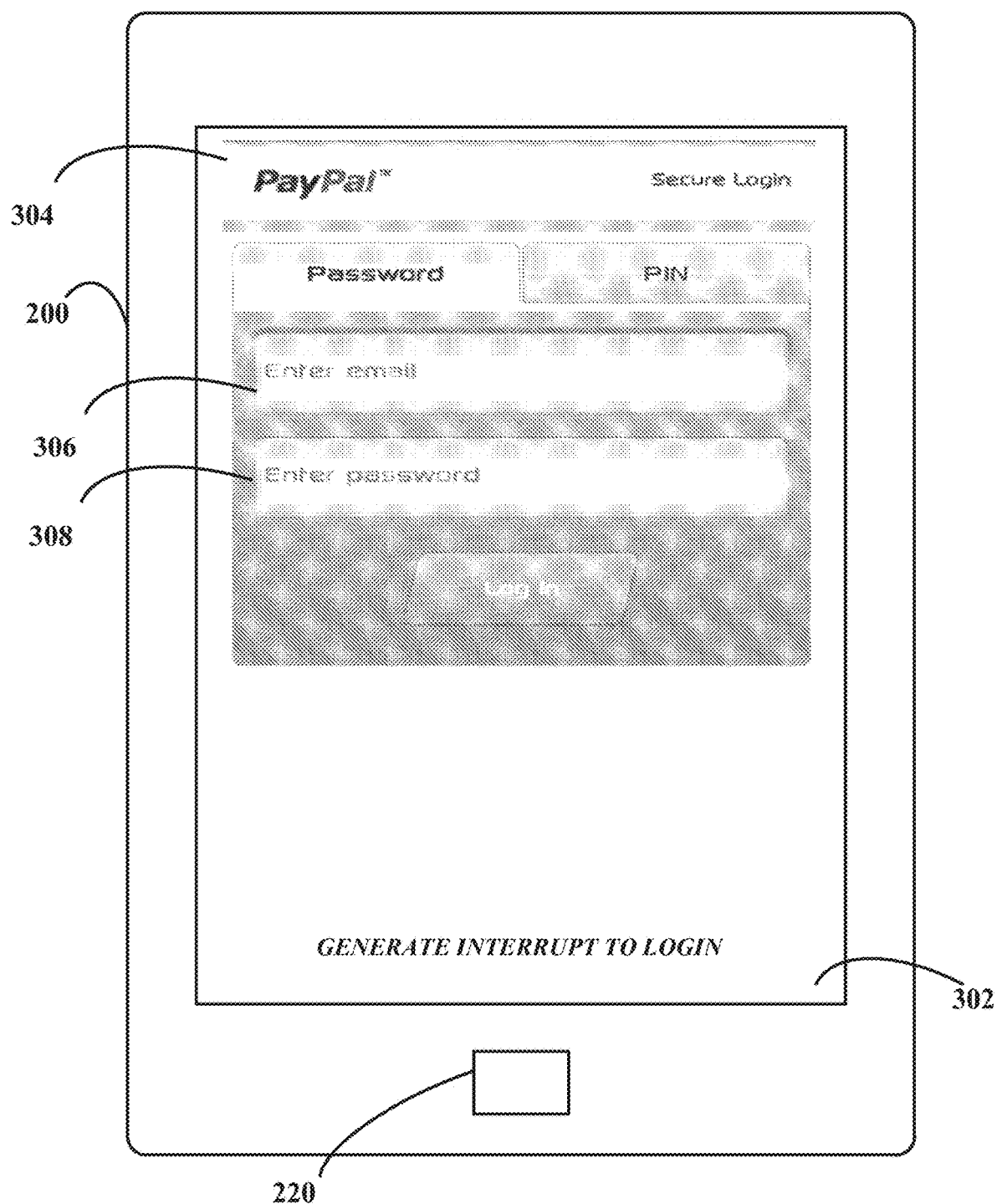
FIGS. 3A-3B are figures illustrating user interfaces for authenticating with a remote server, consistent with some embodiments.
Figure 3B:
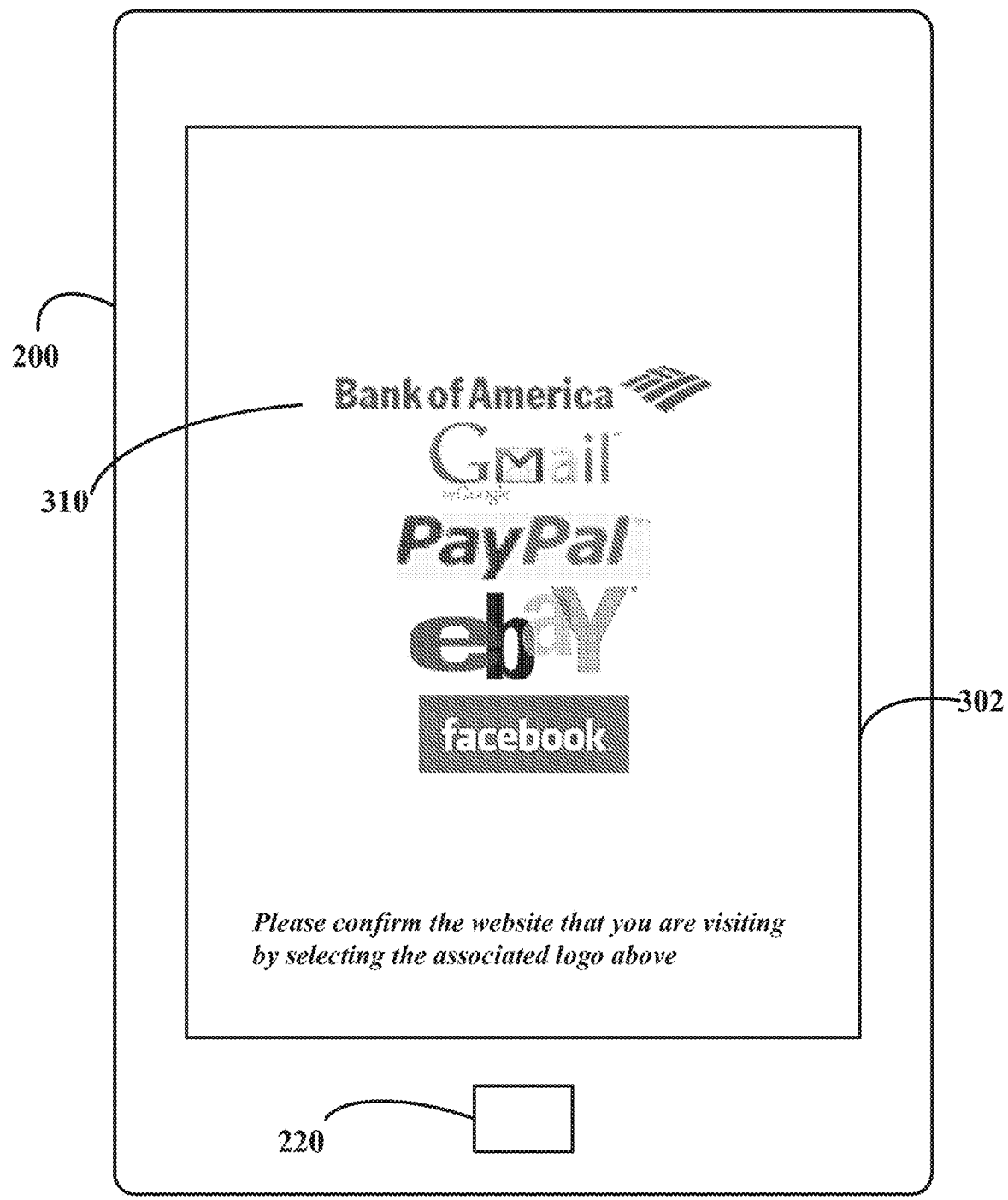

FIGS. 3A-3B are figures illustrating user interfaces for authenticating with remote server 106, consistent with some embodiments. For the purpose of illustration, FIGS. 3A and 3B will be described in conjunction with FIGS. 1 and 2. As shown in FIG. 3A, computing system 200 has a display 302 that may be configured to display content 304, consistent with some embodiments. Content as used herein may refer to that which is displayed on the screen and what user 116 may interact with. Content may include an application, a web page, a context, and/or a login screen associated therewith. Returning to FIG. 3A, content 304 may collect credentials from user 116 such as, for example, requesting a user name 306 and a password 308. Content 304 may collect additional credentials, consistent with some embodiments. Such additional sensitive information may be collected by performing a biometric identification reading. Content 304 may be a login screen provided by an online payment provider such as PayPal, Inc. of San Jose, Calif. Content 304 may be provided by any company or organization requiring a secure authentication access or use their services or access their website.

As shown in FIG. 3A, content 304 may also include additional instructions, such as requiring the user to engage interrupt mechanism 220 when content 304 is displayed. According to some embodiments, user 116 may be conditioned to generate an interrupt by engaging interrupt mechanism 220 when content 304 is displayed, such as is described in U.S. patent application Ser. No. 13/339,275, filed on Dec.

28, 2011, which is assigned to the same assignee that this application is subject to assignment to, and which is incorporated by reference herein in its entirety. When interrupt is engaged, user 116 may be able to enter user credentials such as login 306 and password 308. However, if user 116 does not engage interrupt mechanism 220, they may be unable to enter their user credentials.

However, malicious content that attempts to mimic or spoof content 304 may be nearly identical to login screen 304 such that most users may not easily detect the malicious content. For example, an attacker may create a malicious site that looks like content 304 when rendered, but may actually lead to a different website. As a result, users may be tricked into entering their user name 306 and password 308 on malicious login screen, which will then be transmitted to an attacker instead of to PayPal. The attacker can then use the intercepted user name 306 and password 308 to log in to the user's PayPal account and obtain financial or other information.

Consistent with some embodiments, the one or more processors of processing component 206 may be configured to analyze content 304 by detecting HyperText Markup Language (HTML) tags and other metadata of the displayed content and to determine the true identity of the displayed content. Moreover, processing component 206 may execute a scripting language such as JavaScript to execute a received injected script from, for example, remote server 106, including instructions for detecting the identity of the displayed content. By analyzing the displayed content, computing system 200 may execute instructions for generating a list of websites based on the analyzed content. The generated list may include the true identity of the displayed content and may also include additional websites to which user 116 routinely provides credentials. A sample list is shown in FIG. 3B.

As shown in FIG. 3B, computing system 200 may present a list 310 to user showing a number of different websites to which user 116 has previously provided credentials. List 310 may be generated by computing system 200 based on a history of previously accessed websites stored in website database 115, 121, or 126. User 116 may then be asked to identify the website from list 310 that user 116 believes they are providing their credentials to. If user 116 selects the website that matches the true identity of the website as determined by the content analysis, user 116 will be allowed to proceed to the website, and user's 116 credentials will be provided to the website. However, if user selects a website that does not match the true identity of the website as determined by the content analysis, user 116 will not be allowed to directly proceed to the website, and user credentials will not be directly provided to the selected website, effectively terminating the action.

However, users often utilize the same credentials to login to many different remote servers 106. Such practice leaves user 116 vulnerable. For example, if user 116 uses the same credentials for online banking and a payment service provider, such as PayPal, if the online banking database is breached and an attacker gains the user's credentials, the attacker will then be successful if attempting to login to the payment service provider. One way to prevent this is to make user 116 aware of the reuse of credentials and prevent the user from inadvertently logging into the wrong site using list 310 generated by analyzing content. For example, computing system 200 may analyze the actions of user 116 to determine the credentials provided to remote servers 108 when logging into various websites. Such analysis may be performed by browser app 112 and 118, which often asks to save credentials for future use, or by website database 115 and 121. Through this analysis, computing system 200 may identify the websites for which user 116 uses the same credentials for logging in and present them in list 310.

When user 116 attempts to access a website, user 116 may first engage the interrupt mechanism 220 and then proceed to enter credentials such as a user name 306 and password 308. When user 116 submits the credentials, computing system 200 analyzes the credentials and generates a list 310 of all of the websites that user 116 uses the same credentials to log in to. User 116 may then be asked to identify the website that they believe they are logging into by selecting the website from list 310. If user 116 selects the website that matches the true identity of the website as determined by the content analysis, user 116 will be allowed to proceed to the website, and user's 116 credentials will be provided to the website. User 116 will also be notified that the credentials for this website match the credentials that are used by the other listed website, and advise user 116 to change credentials. Consistent with some embodiments, remote server 106, which may correspond to an authentication server for websites listed in list 310, may receive a notification informing them that user 116 is reusing credentials so that they can take it upon themselves to ask user to change credentials.

Figure 4A:
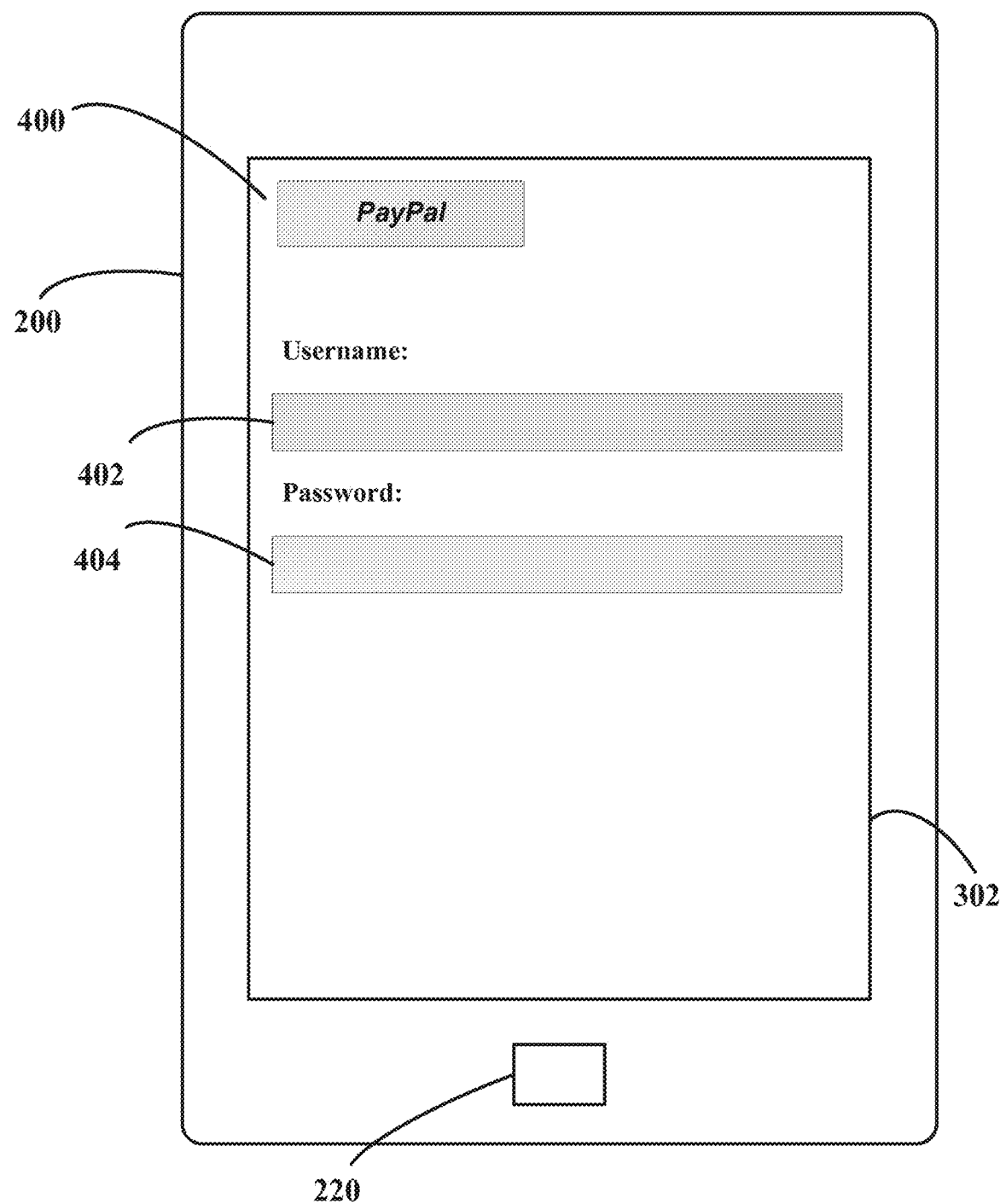
FIGS. 4A-4E are diagrams illustrating displayed content corresponding to potentially malicious websites, consistent with some embodiments.

FIGS. 4A-4E are diagrams illustrating displayed content corresponding to potentially malicious websites, consistent with some embodiments. As shown in FIG. 4A, computing system 200 may display content 400 on screen 302 including a request for credentials such as a username 402 and password 404. Content 400 states that the website corresponds to "PayPal", but the website looks much different than content 304, and the logo for the website looks much different. Content 400 appears to be malicious and, if user 116 does not notice the differences, could capture the credentials of user 116 and provide them to an attacker.

Figure 4B:
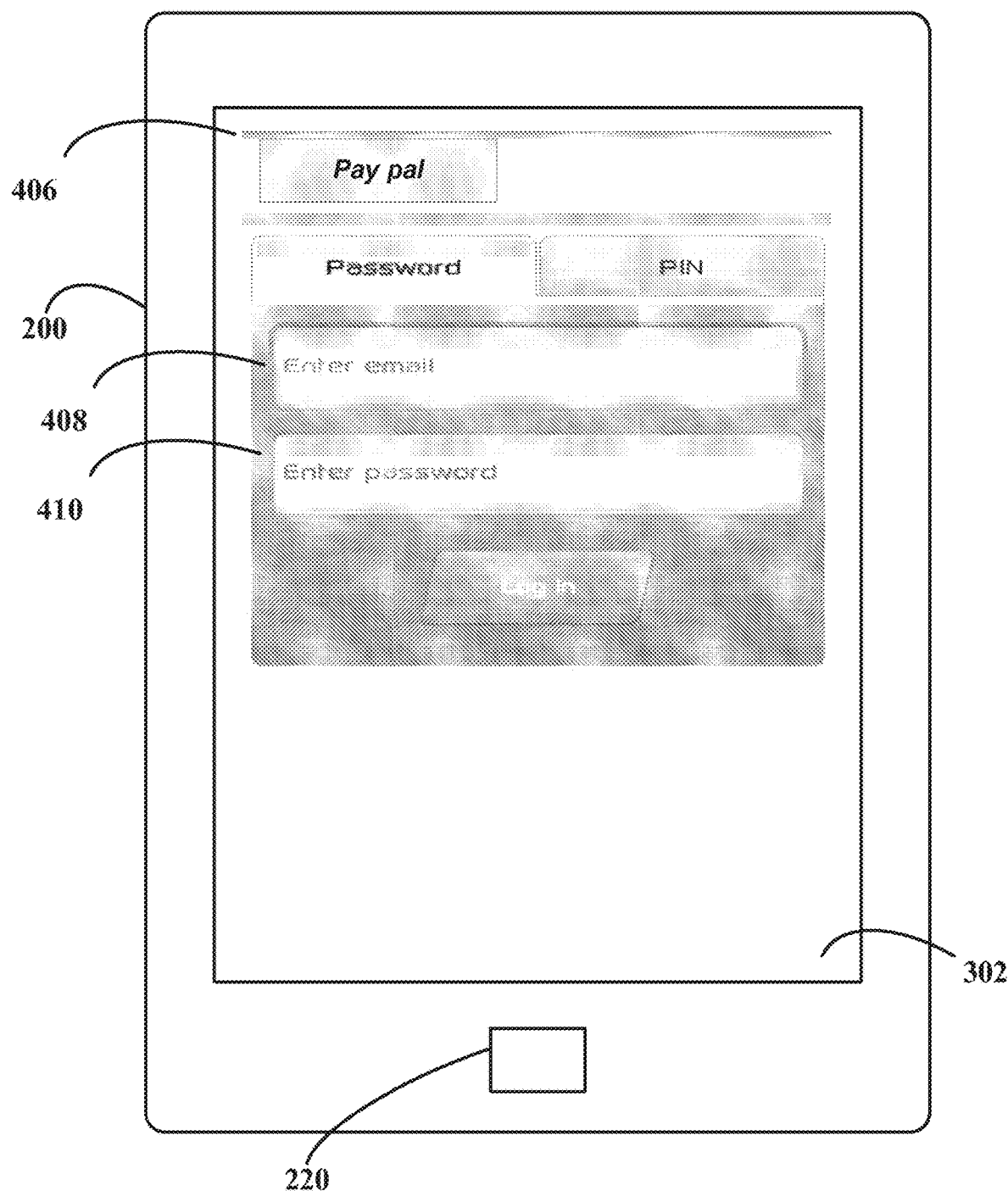

Similarly, FIG. 4B illustrates content 406 that includes a request for credentials such as a username 408 and a password 410. Here, content 406 looks closer to content 304, wherein only the PayPal logo and name is different from the original, and may be likely to trick user 116 into divulging their credentials.

Figure 4C:
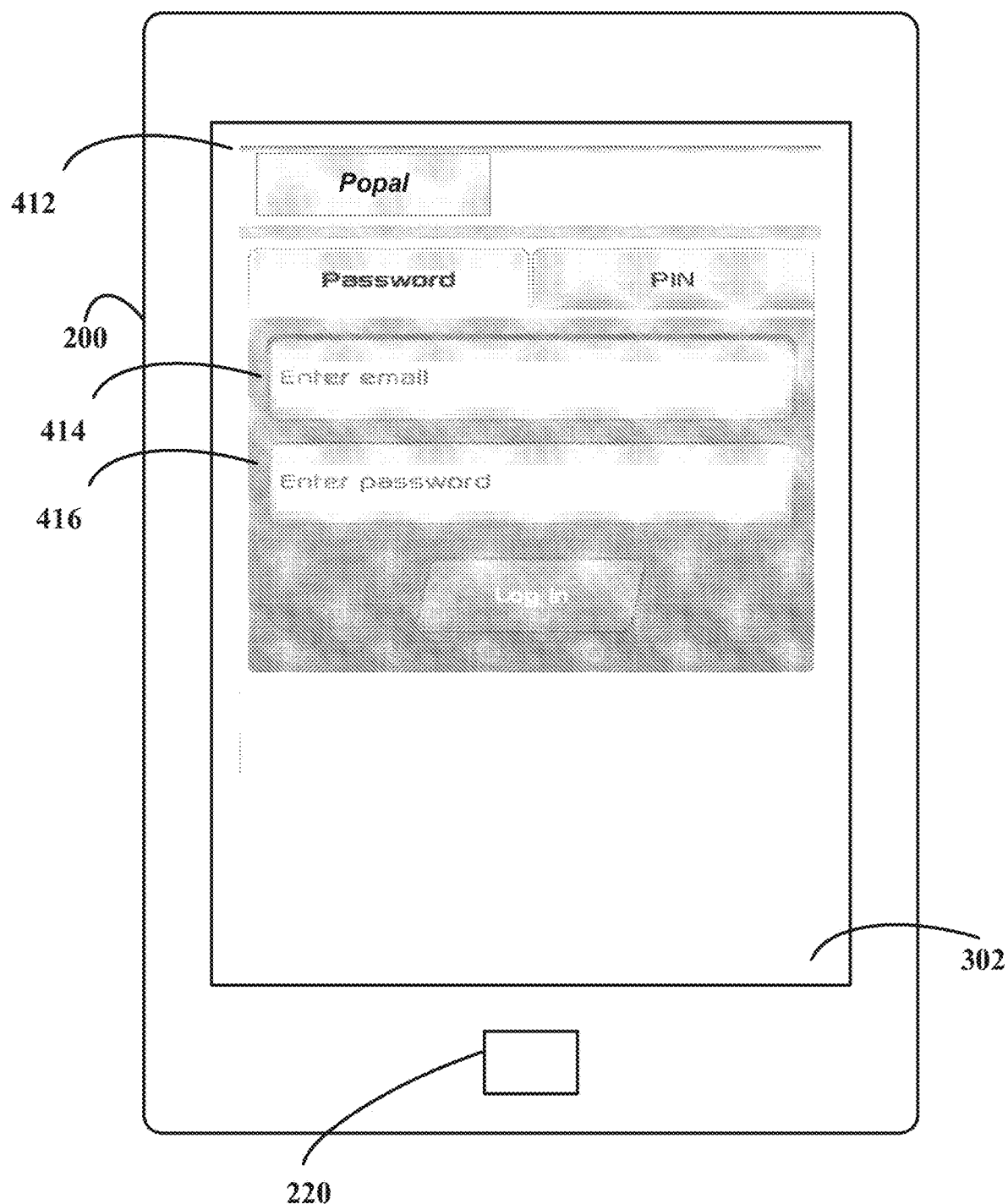
Figure 4D:
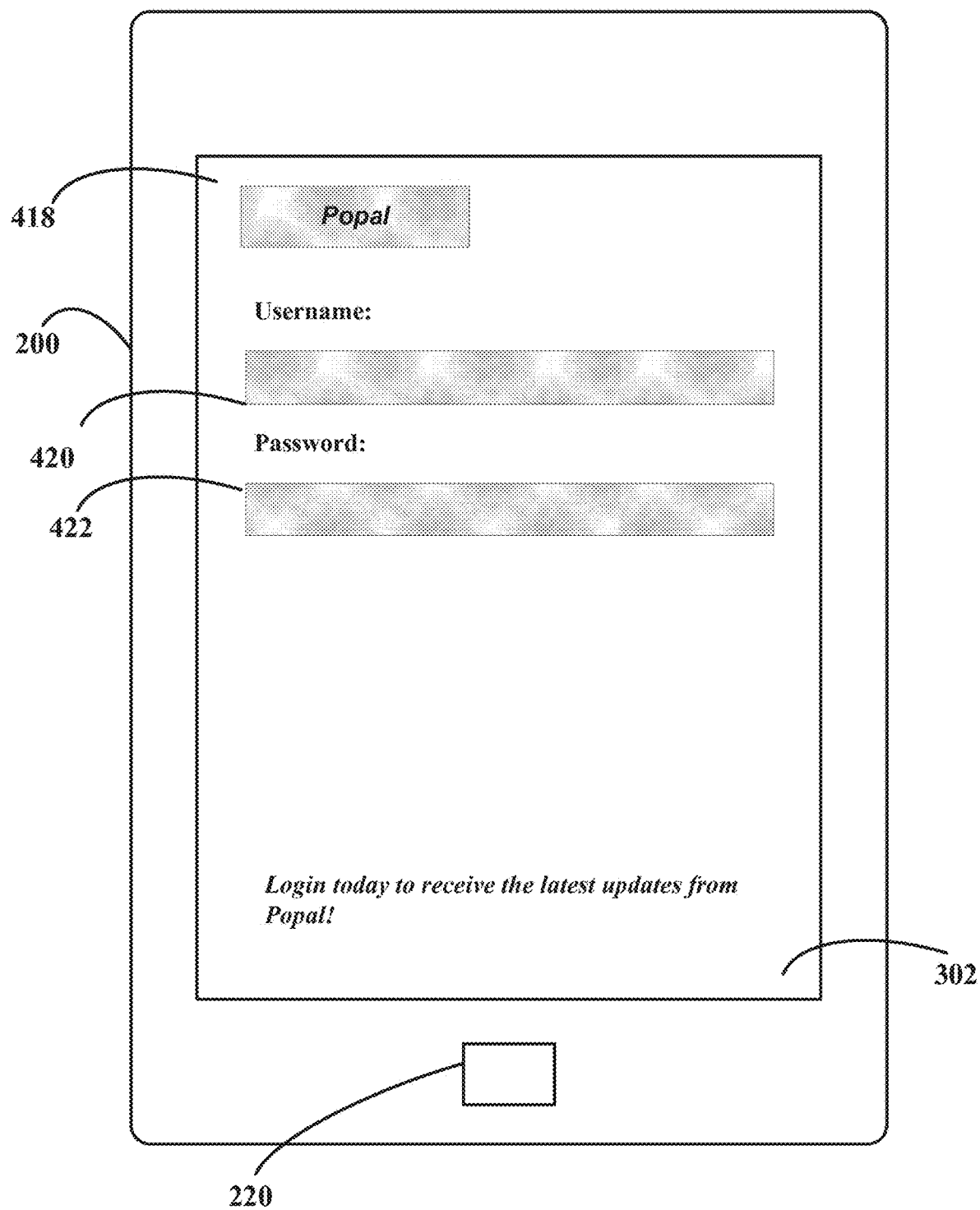

FIG. 4C illustrates content 412 that includes a request for credentials such as a username 414 and a password 416. Here, content 412 also closely resembles content 304, but instead is called "Popal", and may be malicious. FIG. 4D also shows content 418 requesting a username 420 and a password 422 for a site called "Popal". However, content 418 looks much different than content 304 and also includes a message asking users to login to receive the latest updates from Popal. Consequently, content 418 may be a website for a company called Popal that just happens to have a name that sounds similar to PayPal, and may not be malicious. However, in order to provide a secure authentication for user 116, processing component 206 may analyze content 400, 406, 412, and 418 to determine the identity of the website and the actual destination of information transmitted to the website. Processing component 206 may then generate a list and ask user to select the website that they are trying to access from the list.

Figure 4E:
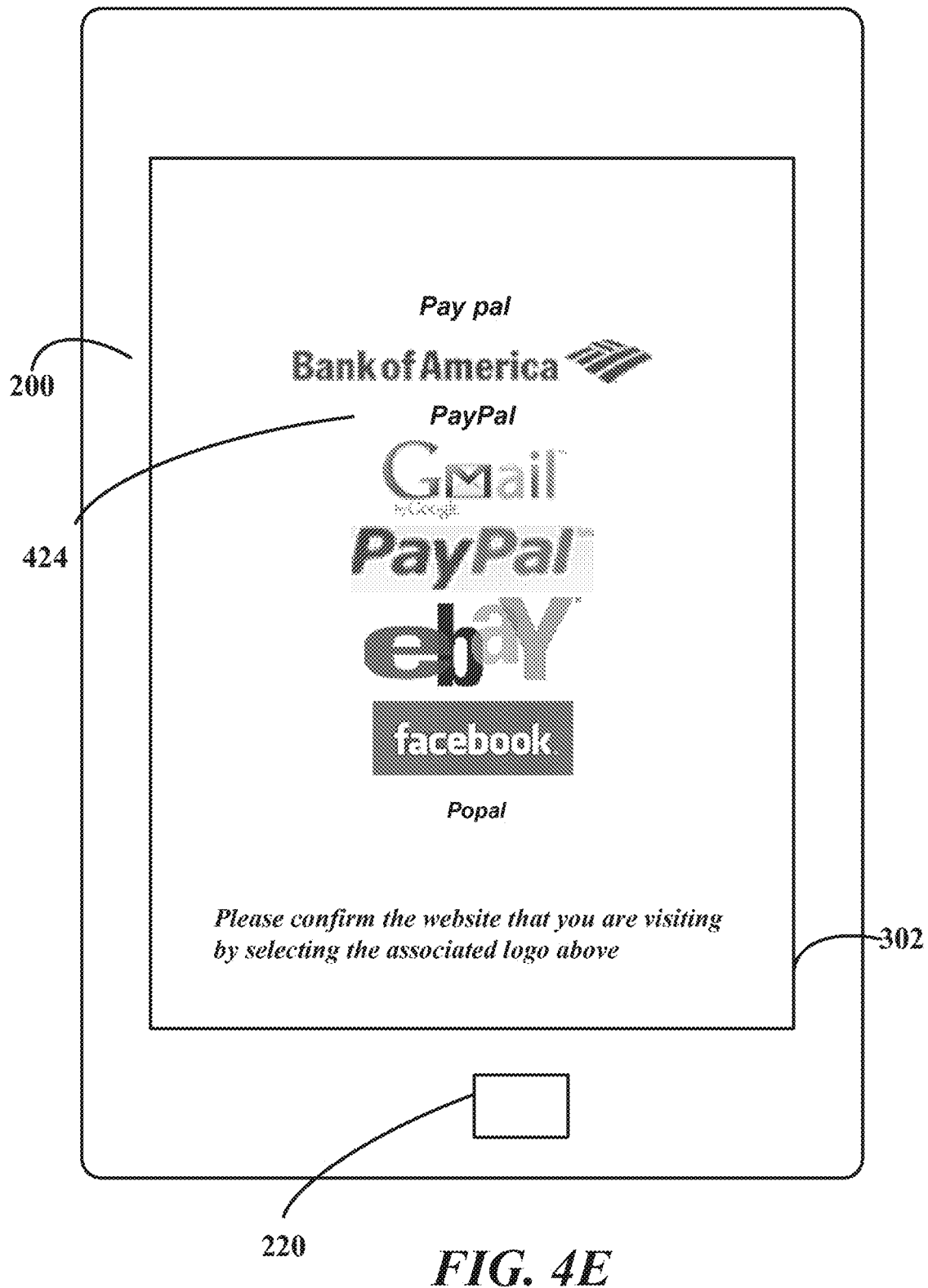

FIG. 4E shows a list 424 generated from, for example, any of content 304, 400, 406, 412, and 418. List 424 may also be generated from website databases 115, 121, and 126, which may provide information about common websites visited by user 116, websites to which user 116 uses common credentials for accessing, and websites that have similar characteristics such as name, layout, and function, as the website that user 116 is attempting to login to. If user 116 selects the website that matches the true identity of the website as determined by the content analysis, user 116 will be allowed to proceed to the website, and user's 116 credentials will be provided to the website. If user 116 selects a website that does not match the true identity of the website as determined by the content analysis, user will not be able to proceed to the website. As shown in FIG. 4E, list 424 may include websites to which user 116 logs into often, and may also include similar websites known by computing system 200 from past web history or by remote server 106 which may store such a list in website database 126 and provide the list to computing system 200 upon an attempted access.

Consistent with some embodiments, user 116 reviewing list will see that the logos or names of the websites associated with content 400, 406, 412, and 418 looks much different from the actual PayPal logo shown in list 424 and shown in content 304. As a result, if user 116 is attempting to log into PayPal, user 116 will select the correct PayPal logo and, if the true identity of the website as determined by content analysis is PayPal, user 116 will be permitted to access the PayPal website. However, if user is interacting with content 406, believing that it corresponds to the official PayPal website, and selects the correct PayPal logo from list 424, user will not be allowed to directly access the website as it actually corresponds to "Pay pal". According to some embodiments, list 424 will also display the logos and content of unknown websites such as "Pay pal" or "Popal" less prominently than the known websites, as a visual indicator to user 116 that such websites are not known to be secure.

Consistent with some embodiments, user 116 may actually be interested in content 418 and desire to log in to Popal to receive the latest updates from Popal. In such a situation, user 116 when presented with list 424 will select Popal and, if content analysis demonstrates that the website that matches the true identity of the website as determined by the content analysis, user 116 will be allowed to proceed to the Popal website, and user's 116 credentials will be provided to the Popal website. According to some embodiments, a successful login to the Popal website may identify Popal as being a legitimate and not malicious site, and could be reported to remote server 106 to be added to website database 126 identifying Popal as a legitimate website. According to further embodiments, Popal could be added to a whitelist maintained by remote server 106 or another server or collection of servers not shown.

Figure 5:
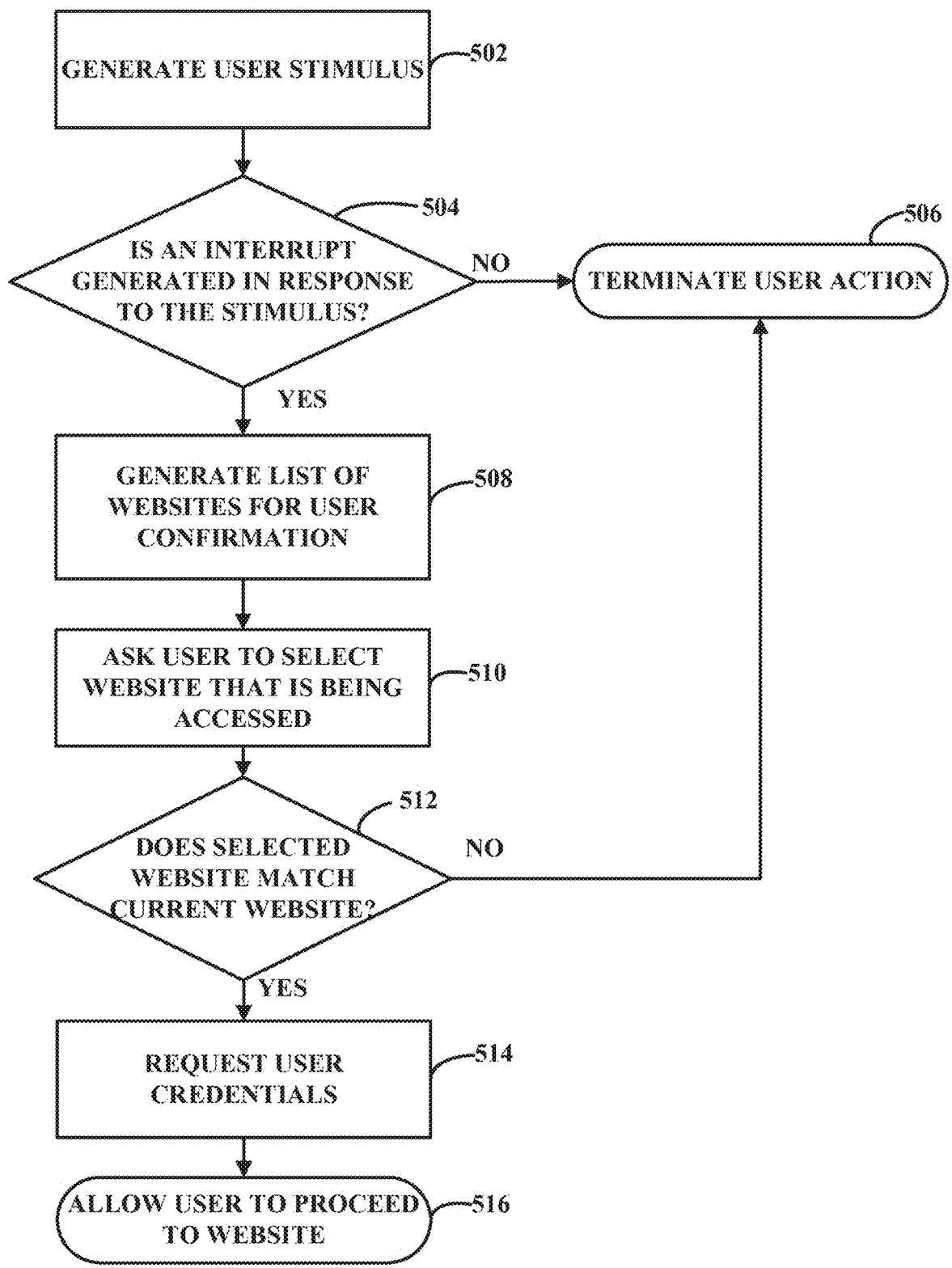
FIG. 5 is a flowchart illustrating a method for authenticating a user attempting to access a website, consistent with some embodiments.

FIG. 5 is a flowchart illustrating a method for authenticating a user attempting to access a website, consistent with some embodiments. For the purpose of illustration, FIG. 5 will be described with reference to FIGS. 1, 2, 3A and 3B. The method shown in FIG. 5 may be embodied in computer-readable instructions for execution by one or more processors in processing component 206 such that the steps of the method may be performed by any of client mobile device 102, client computing device 104, remote server 106, and a combination thereof. As shown in FIG. 5, the method begins by generating a user stimulus when user 116 accesses a webpage, such as content 304, requiring credentials, such as username 306 and password 308 (502). Computing system 200 will determine if an interrupt is generated using interrupt mechanism 220 in response to the stimulus (504). If user 116 does not generate a stimulus, computing system 200 will not allow user 116 to provide their credentials and access the website, effectively terminating the action of user 116 (506).

If user 116 generates an interrupt in response to the stimulus, computing system 200 generates a list 310 of websites for user confirmation (508). Consistent with some embodiments, list 310 may be generated based on websites that user 116 has accessed that require secure credentials. List 310 may be generated based on content from such websites saved in website database 115, 121, or 126. Computing system 200 will display list 310 and ask user 116 to select the website that the user is accessing (510). Once user makes a selection, computing system 200 will determine if the website selected by user 116 from list matches the current website (512). If computing system 200 determines that user 116 selected a website from list 310 that matches the current website, the webpage, such as content 304, will request the user credentials, such as username 304 and password 306, by allowing user 116 to enter information into these fields (514), and then user 116 will be allowed to proceed to the website by, for example, providing the entered credentials to the website, or a server such as remote server 106 hosting the website (516). However, if user 116 is determined to have made the wrong selection from list 310, computing system 200 will not allow user 116 to enter their credentials and directly access the website, effectively terminating the action of user 116 (506).

Figure 6:
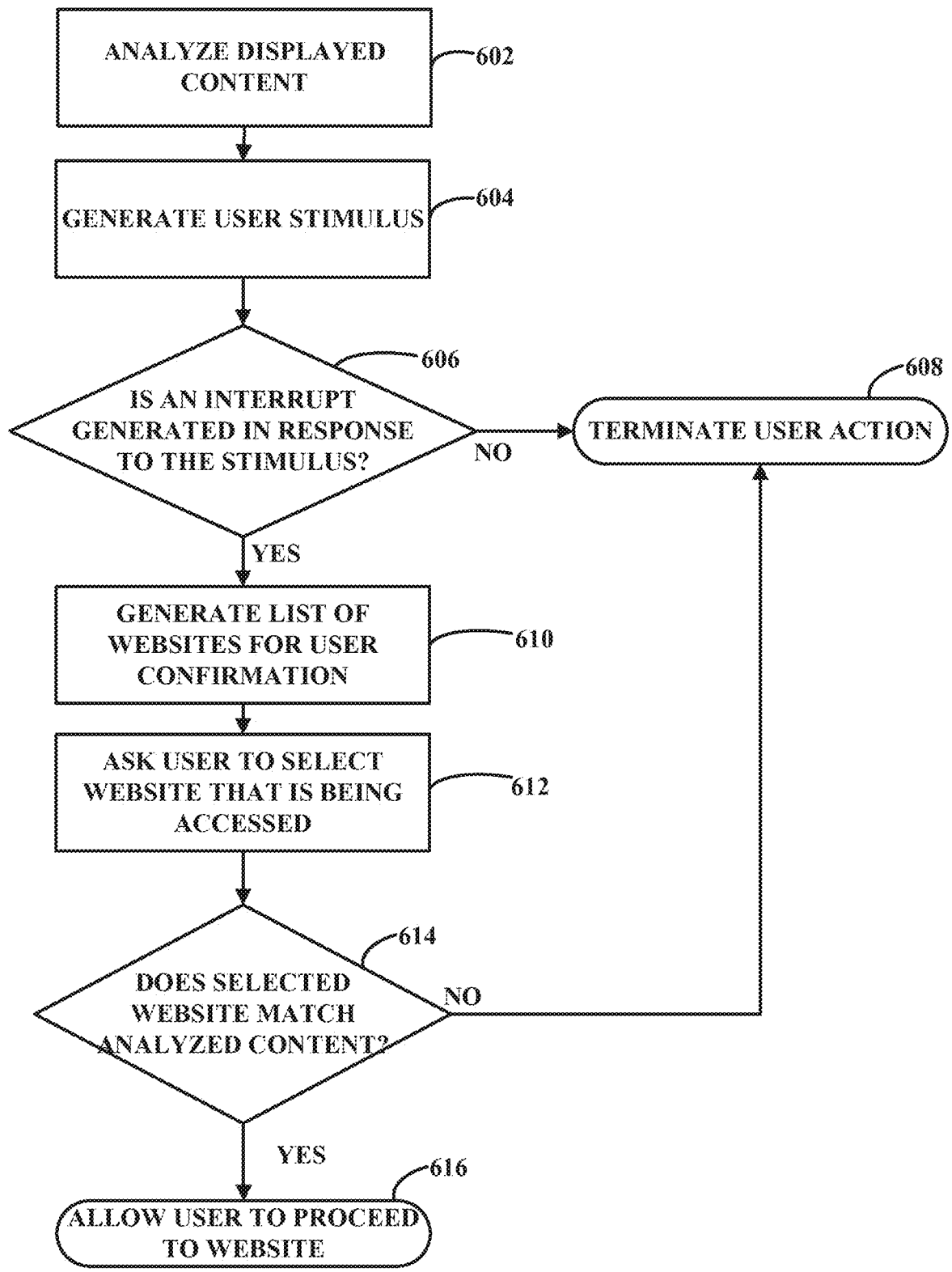
FIG. 6 is a flowchart illustrating a method for authenticating a user attempting to access a website, consistent with some embodiments.

FIG. 6 is a flowchart illustrating a method for authenticating a user attempting to access a website, consistent with some embodiments. For the purpose of illustration, FIG. 6 will be described with reference to FIGS. 1, 2, 3A, 3B, and 4A-4E. The method shown in FIG. 6 may be embodied in computer-readable instructions for execution by one or more processors in processing component 206 such that the steps of the method may be performed by any of client mobile device 102, client computing device 104, remote server 106, and a combination thereof. As shown in FIG. 6, the method begins by analyzing displayed content on a screen of computing system 200 (602). The displayed content may be any of content 304, 400, 406, 412, or 418, and the analysis may involve determining a true identity of the displayed content, the destination of information transmitted from the content, and/or displayed logos and key words. In some embodiments, the information related to the displayed content obtained from the analysis may be stored in any of website database 115, 121, or 126 and may be used in future authentications.

Returning to FIG. 6, computing system 200 then generates a user stimulus when user 116 accesses a webpage, such as content 304, 400, 406, 412, or 418 requiring credentials (604). Computing system 200 may determine if an interrupt is generated by monitoring interrupt mechanism 220 in response to the stimulus (606). If user 116 does not generate a stimulus, computing system 200 will not allow user 116 to provide their credentials and access the website, effectively terminating the action of user 116 (608). If user 116 generates an interrupt in response to the stimulus, computing system 200 will generate a list 424 of websites based on the analyzed content (610). List 424 may be generated from, for example, any of content 304, 400, 406, 412, and 418. List 424 may also be generated from website databases 115, 121, and 126, which may provide information about common websites visited by user 116 and websites that have similar characteristics such as name, layout, and function, as the website that user is attempting to login to. Computing system 200 may display list 424 and ask user 116 to select the website that the user is accessing (612). Once user makes a selection, computing system 200 will determine if the website selected by user 116 from list 424 matches the current website corresponding to the analyzed content (614). If computing system 200 determines that user 116 selected a website from list 424 that matches the current website, user will be allowed to proceed to the website (616). However, if user 116 is determined to have made the wrong selection from list 424, computing system 200 will not allow user 116 to provide their credentials and directly access the website, effectively terminating the action of user 116 (608).

Figure 7:
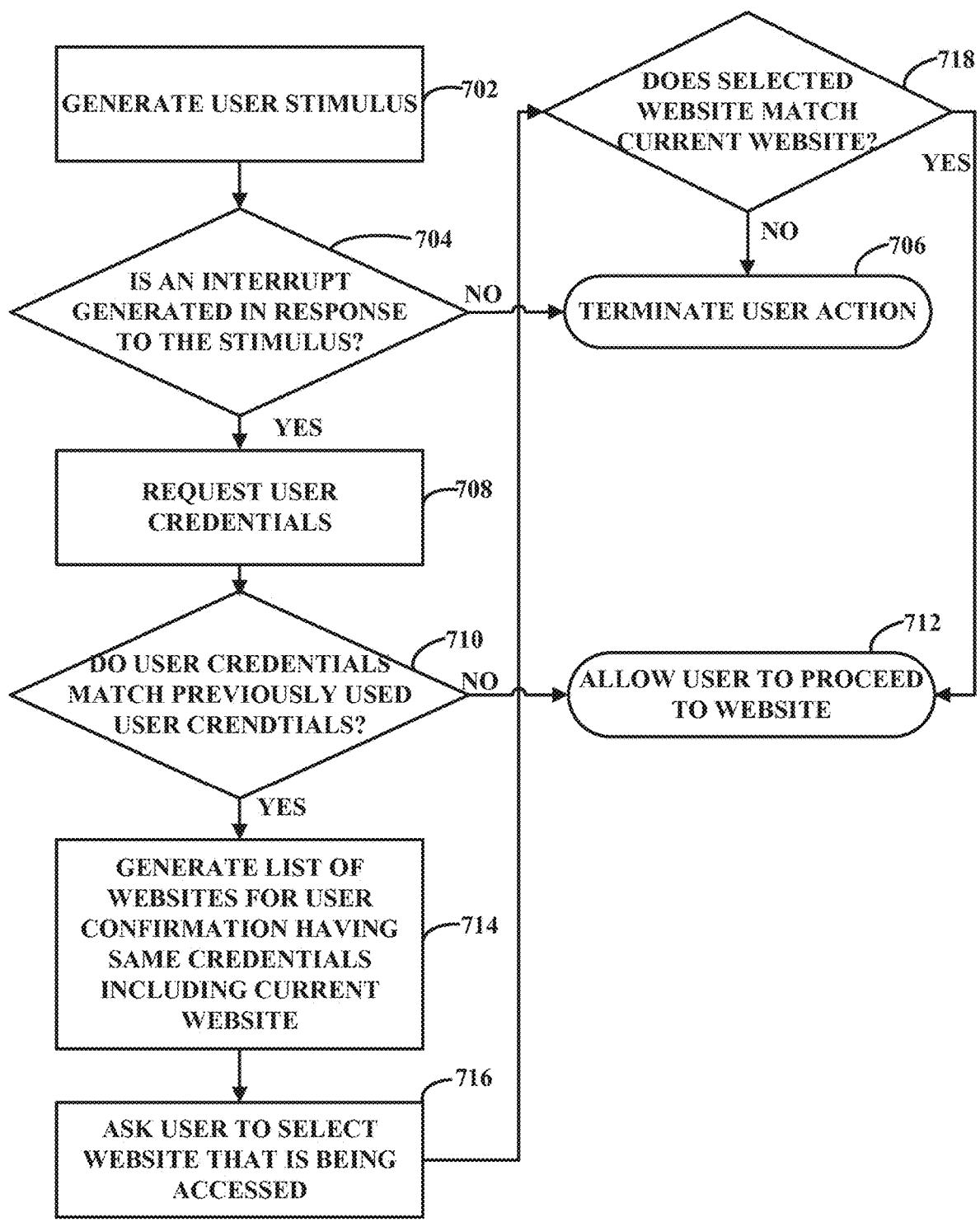
FIG. 7 is a flowchart illustrating a method for authenticating a user attempting to access a website, consistent with some embodiments.

FIG. 7 is a flowchart illustrating a method for authenticating a user attempting to access a website, consistent with some embodiments. For the purpose of illustration, FIG. 7 will be described with reference to FIGS. 1, 2, 3A and 3B. The method shown in FIG. 7 may be embodied in computer-readable instructions for execution by one or more processors in processing component 206 such that the steps of the method may be performed by any of client mobile device 102, client computing device 104, remote server 106, and a combination thereof. As shown in FIG. 7, the method begins by generating a user stimulus when user 116 accesses a webpage, such as content 304, requiring credentials, such as username 306 and password 308 (702). Computing system 200 will determine if an interrupt is generated using interrupt mechanism 220 in response to the stimulus (704). If user 116 does not generate a stimulus, computing system 200 will not allow user 116 to provide their credentials and access the website, effectively terminating the action of user 116 (706). If user 116 generates an interrupt in response to the stimulus, the webpage, such as content 304, will request the user credentials, such as username 304 and password 306, by allowing user 116 to enter information into these fields (708).

Once the user credentials have been entered, computing system 200 will determine if the entered user credentials match previously used user credentials as may be stored in website database 115, 121, or 126 (710). If the user credentials do not match any previously used credentials, the user will be allowed to proceed to the website (712). However, if the user credentials are determined to match previously used credentials, computing system 200 will generate a list 310 of websites that user 116 uses the same credentials to access (714). Computing system 200 will display list 310 and ask user 116 to select the website that the user is accessing (716). Once user makes a selection, computing system will determine if the website selected by user 116 from list matches the current website (718). If computing system 200 determines that user 116 selected a website from list 310 that matches the current website, user 116 will be allowed to proceed to the website (712). User 116 and remote server 106 may be notified that they are reusing credentials, wherein user 116 may be notified to change their credentials. However, if user 116 is determined to have made the wrong selection from list 310, computing system 200 will not allow user 116 to provide their credentials and directly access the website, effectively terminating the action of user 116 (706).

Figure 8:
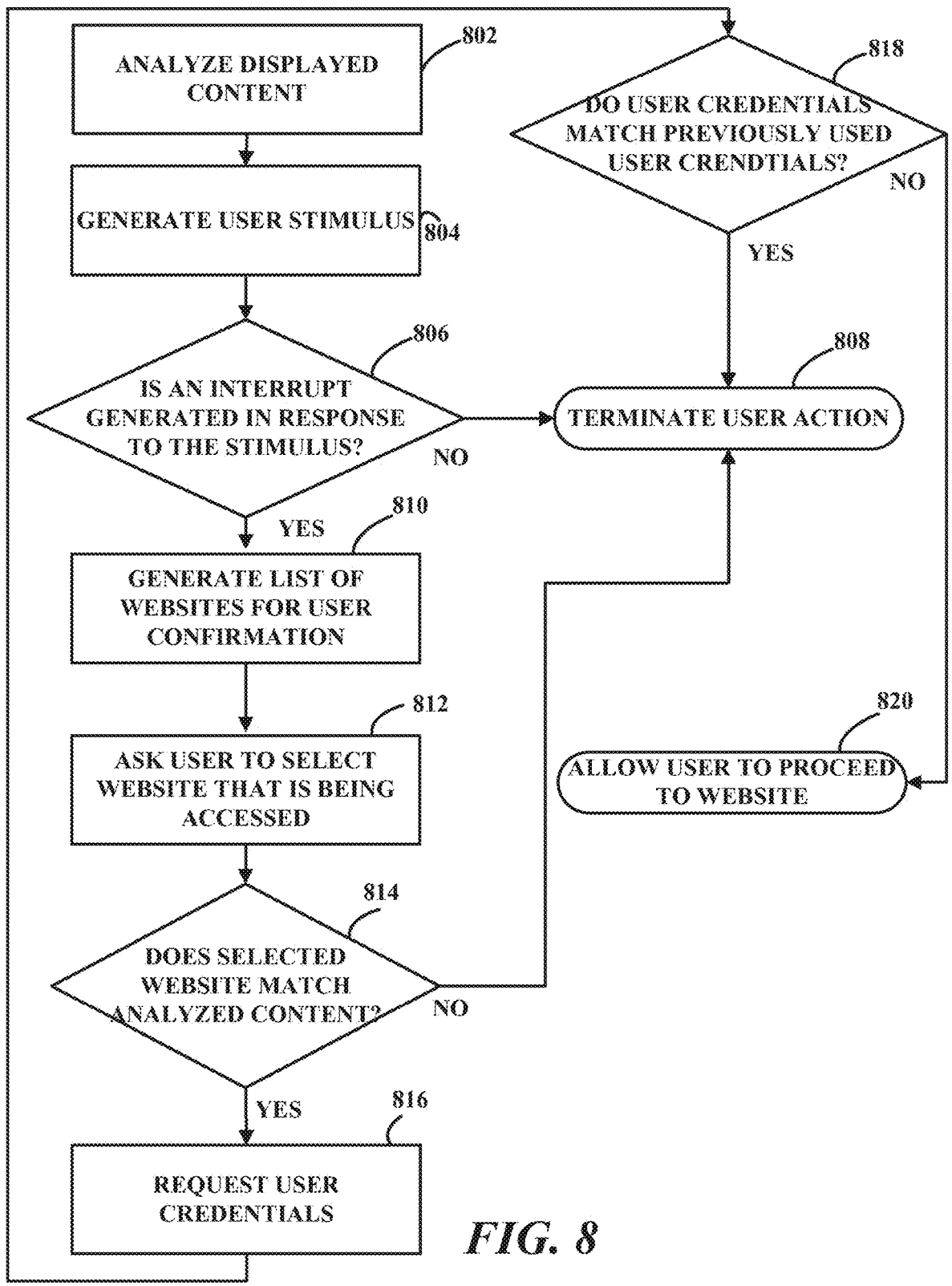
FIG. 8 is a flowchart illustrating a method for authenticating a user attempting to access a website, consistent with some embodiments.

FIG. 8 is a flowchart illustrating a method for authenticating a user attempting to access a website, consistent with some embodiments. For the purpose of illustration, FIG. 8 will be described with reference to FIGS. 1, 2, 3A, 3B, and 4A-4E. The method shown in FIG. 8 may be embodied in computer-readable instructions for execution by one or more processors in processing component 206 such that the steps of the method may be performed by any of client mobile device 102, client computing device 104, remote server 106, and a combination thereof. As shown in FIG. 8, the method begins by analyzing displayed content on a screen of computing system 200 (802). The displayed content may be any of content 304, 400, 406, 412, or 418, and the analysis may involve determining a true identity of the displayed content, the destination of information transmitted from the content, and/or displayed logos and key words. In some embodiments, the information related to the displayed content obtained from the analysis may be stored in any of website database 115, 121, or 126 and may be used in future authentications.

Returning to FIG. 8, computing system 200 then generates a user stimulus when user 116 accesses a webpage, such as content 304, 400, 406, 412, or 418 requiring credentials (804). Computing system 200 will determine if an interrupt is generated using interrupt mechanism 220 in response to the stimulus (806). If user 116 does not generate a stimulus, computing system 200 will not allow user 116 to provide their credentials and access the website, effectively terminating the action of user 116 (808). If user 116 generates an interrupt in response to the stimulus, computing system 200 generates a list 310 or 424 of websites for user confirmation (810). Consistent with some embodiments, list 310 or 424 may be generated based on websites that user 116 has accessed that require secure credentials. List 310 or 424 may be generated based on content from such websites saved in website database 115, 121, or 126. Computing system 200 will display list 310 or 424 and ask user 116 to select the website that the user is accessing (812).

Once user makes a selection, computing system 200 will determine if the website selected by user 116 from list 310 or 424 matches the current website (814). If computing system 200 determines that user 116 selected a website from list 310 or 424 that matches the current website, the webpage, such as content 304, will request the user credentials, such as username 304 and password 306, by allowing user 116 to enter information into these fields (816). However, if user 116 is determined to have made the wrong selection from list 310 or 424, computing system 200 will not allow user 116 to enter their credentials and directly access the website, effectively terminating the action of user 116 (808).

Once the user credentials have been entered, computing system 200 will determine if the entered user credentials match previously used user credentials as may be stored in website database 115, 121, or 126 (818). If the user credentials do not match any previously used credentials, the user will be allowed to proceed to the website (820). However, if the user credentials are determined to match previously used credentials, computing system 200 will not allow user 116 to provide their credentials and access the website, effectively terminating the action of user 116 (808).

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide methods, systems, and devices capable of decreasing the likelihood that a user is tricked into disclosing personal or financial information to an attacker. In particular, embodiments as described herein may leverage a user's attention or inattention to the true identity of the displayed content with respect to the content the user believes they are visiting to curtail users providing their credentials to malicious websites by requiring the user to identify the website that they are attempting to visit. Further, embodiments as disclosed herein may make users aware when they use the same credentials on multiple websites and encourage them to use different credentials on these different sites to increase their protection from attack. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system, comprising:
a non-transitory memory; and
one or more hardware processors coupled to the non-transitory memory and configured to execute instructions from the non-transitory memory to cause the system to perform operations comprising:
determining that a user has accessed a first content page;
analyzing the first content page;
identifying, in response to analyzing the first content page, an entity that is associated with the first content page and that is associated with an entity image;
identifying a plurality of service providers that are each associated with the user and a respective service provider image;
providing, for display on a display device that is provided with a computing device that is associated with the user:
a first selectable element that corresponds to the entity and that includes the entity image; and
a second selectable element that corresponds to a first service provider of the plurality of service providers and that includes the respective first service provider image associated with the first service provider;
receiving, from the computing device, a user selection of the first selectable element;
determining that the user selection corresponds to the first selectable element; and
permitting, in response to determining that the user selection corresponds to the first selectable element, communication of an authentication credential to the entity.

2. The system of claim 1, wherein the operations further comprise:
receiving the authentication credential via the first content page;
determining that the authentication credential corresponds to an entry in a database of stored authentication credentials that have been used with at least one second content page; and
providing, for display on the display device that is provided with the computing device that is associated with the user, an indication that the authentication credential is used with at least one second content page.

3. The system of claim 1, wherein analyzing the first content page further comprises:
analyzing one or more of: a logo displayed on the first content page, key words displayed on the first content page, a destination of information transmitted from the first content page, or a layout of the first content page.

4. The system of claim 1, wherein the operations further comprise:
providing, for display on the display device that is provided with the computing device that is associated with the user, a user stimulus;
receiving, from the computing device, a response to the user stimulus, wherein the communication of the authentication credential is permitted in response to both receiving the user selection of the first selectable element and receiving the response to the user stimulus.

5. The system of claim 1, wherein the entity image identifies the entity.

6. The system of claim 1, wherein at least one of the plurality of service providers is identified based on a history of websites that were previously accessed by the user.

7. The system of claim 1, wherein at least one of the plurality of service providers is identified based on a website for which the user has previously provided the authentication credential.

8. A non-transitory machine-readable medium having stored thereon machine-readable instructions which, when executed by one or more processors, cause a machine to perform operations comprising:
analyzing a first content page that has been accessed by a user;
identifying, in response to analyzing the first content page, an entity that is associated with the first content page;
identifying a plurality of service providers that are associated with the user;
providing, for display via a computing device that is associated with the user, a plurality of selectable elements that include:
a first selectable element that includes an entity image associated with the entity; and
at least one respective second selectable element for each of the plurality of service providers that were identified, wherein each respective second selectable element includes a respective service provider image associated with a respective one of the plurality of service providers for which that second selectable element is provided;
receiving, from the computing device, a user selection of one of the plurality of selectable elements;
determining that the user selection corresponds to the first selectable element; and
providing, in response to determining that the user selection corresponds to the first selectable element, for communication of authentication credentials to the entity.

9. The non-transitory machine-readable medium of claim 8, wherein the operations further comprise:
receiving the authentication credentials through the first content page;
determining that the authentication credentials are used with at least one second content page; and
providing, for display via the computing device that is associated with the user, an indication that the authentication credentials are used with the at least one second content page.

10. The non-transitory machine-readable medium of claim 8, wherein analyzing the first content page further comprises:
analyzing one or more of: a logo displayed on the first content page, key words displayed on the first content page, a destination of information transmitted from the first content page, or a layout of the first content page.

11. The non-transitory machine-readable medium of claim 8, wherein the operations further comprise:
receiving, from the computing device, a response to a user stimulus provided for display on the computing device, wherein the communication of the authentication credential is permitted in response to both determining that that user selection corresponds to the first selectable element and receiving the response to the user stimulus.

12. The non-transitory machine-readable medium of claim 8, wherein the entity image includes an entity name of the entity.

13. The non-transitory machine-readable medium of claim 8, wherein at least one of the plurality of service providers is identified based on an Internet browser history associated with the user.

14. The non-transitory machine-readable medium of claim 8, wherein at least one of the plurality of service providers is identified based on having previously received the authentication credentials from the user.

15. A computer-implemented method, comprising:
   determining, by a system provider device, that a first content page has been accessed;
   analyzing, by the system provider device, the first content page;
   identifying, by the system provider device in response to analyzing the first content page, an entity that is associated with the first content page and that is associated with an entity image;
   identifying, by the system provider device, a plurality of content providers that are each associated with the user and a respective content provider image;
   providing, by the system provider device for display on a display device that is provided with a computing device:
      a first selectable element that corresponds to the entity and that includes the entity image; and
      a second selectable element that corresponds to a first content provider of the plurality of content providers and that includes the respective first content provider image associated with the first content provider;
   receiving, from the computing device, a selection of the first selectable element;
   determining that the selection corresponds to the first selectable element; and
   enabling, in response to determining that the selection corresponds to the first selectable element, communication of an authentication credential to the entity.

16. The method of claim 15, further comprising:
   receiving, by the system provider device, the authentication credentials through the first content page;
   determining, by the system provider device, that the authentication credentials are used with at least one second content page; and
   providing, by the system provider device for display on a display device that is provided with a computing device, an indication that the authentication credentials are used with the at least one second content page.

17. The method of claim 15, wherein analyzing the first content page further comprises analyzing one or more of: a logo displayed on the first content page, key words displayed on the first content page, a destination of information transmitted from the first content page, or a layout of the first content page.

18. The method of claim 15, further comprising
   receiving, from the computing device, a response to a stimulus provided for display on a display device that is provided with a computing device, wherein the communication of the authentication credential is permitted in response to both determining that that selection corresponds to the first selectable element and receiving the response to the stimulus.

19. The method of claim 15, wherein the entity image provides an indication of the entity.

20. The method of claim 15, wherein at least one of the plurality of content providers is identified based on a history of content page access.

* * * * *